Patented Dec. 3, 1935

2,023,140

UNITED STATES PATENT OFFICE 2,023,140

LIVESTOCK SPRAY

Gideon John Malherbe, Martinez, Calif., assignor to Shell Development Company, San Francisco, Calif., a corporation of Delaware No Drawing. Application October 19, 1932,
Serial No. 638,530

5 Claims. (Cl. 167—36)

This invention relates to the class of substances known as fly sprays, and is more particularly concerned with the fly-repelling sprays.

The general class of fly sprays can be subdivided into 1, insecticides, and 2, repelling sprays.

The insecticides, as the name indicates, possess insect killing properties, and are usually composed of a carrier, such as water or selected petroleum distillate, or their emulsion, and a toxic agent, such as well known arsenic compounds, pyrethrum extract, or specially prepared petroleum products. In order to be effective, an insecticide must be applied directly to the insects. The repellant action of this group of materials on insects is usually rather small.

The second group of materials of this class, although used for the same purpose of combatting insects, relies in its action chiefly upon its repelling effect rather than upon its toxic properties, which toxic properties it normally possesses in a relatively small degree.

Each of these two groups of sprays has its own more or less definite fields of use. Thus, while the insecticides are preferred for exterminating flies, moths, etc. in closed spaces, such as homes, stalls, etc., or for exterminating plant parasites on orchard trees, the dairies are extensively using fly-repelling sprays for protecting live-stock, and particularly cows when these are turned loose outside between milking, and especially during summer time, when pasturage is relatively scarce and the energy of the animals must be preserved for obtaining food. If the animals are subjected to severe fly irritation, the milk production decreases. It is easy to realize, therefore, the importance of developing a readily available and effective fly-repellant.

There is a large number of fly-repelling materials on the market, which function more or less satisfactorily. The requirements which a satisfactory fly-repelling spray should meet, besides simply having a fly-repelling effect, are:

1. It must have no ill effects upon the animal;
2. It must be sufficiently volatile to completely disappear, after being sprayed, in a reasonable period of time;
3. Its repelling action must be relatively lasting.

It is the object of this invention to improve the composition of the fly-repelling materials adapted for protecting live-stock against flies and similar insects.

Ordinarily, the substances of this nature are made up of three types of ingredients: carrier, repellant, and a toxic component. When mixed together they normally produce liquid solutions of uniform consistencies. While observing the behavior of fly sprays, I have noticed that these sprays vary extensively with regard to the requirements listed above. A number of methods for controlling the properties of sprays in order to meet these requirements have been previously known and their efficacies have been confirmed in my work. It is a common practice, for instance, in making fly-repelling sprays to use highly refined mineral oils as carriers for the repellant; the degree of refinement is normally measured by the extent to which the chemically active components found in an unrefined oil have been removed; the unsulfonated residue, as determined by a known concentrated sulfuric acid treatment of the oil, is often used as a measure of the degree of refinement. The higher is the unsulfonated residue, the less will be the harmful effect upon the animal of the spray made with this oil. I have observed, that particularly harmless sprays are produced by using mineral oils having the unsulfonated residue of 85% or higher.

The choice of the mineral oil must depend also on the volatility of the oil. Infrequently highly refined oils are used for fly sprays, which oils possess, however, the very objectionable property of leaving on the hair and skin of the sprayed animal a lasting deposit of residual oil which is very harmful on account of sealing the pores of the animal's skin, and otherwise detrimentally affecting its health. It is advisable, therefore, to use mineral oils having relatively low 90% and/or final boiling points, the former not exceeding 400° C. For merely economical reasons the initial boiling point of mineral oils used should not be below 185° C. I found preferable to use oils beginning to boil at 190° C. and having 90% point at or about 390° C. as determined by A. S. T. M. method 158—28.

These oils, which I use in my fly-repelling sprays may be obtained either by direct fractionation from an oil having the desired boiling range, or can be prepared by blending refined kerosene with a suitable lubricating oil. It is usually desirable to have the viscosity of the produced oil within limits: 40–75 seconds Say. Univ. at 100° F.

While many sprays comprise mineral oils having properties closely corresponding to the limits set hereinbefore, I have found that adhering to the limits set above has a decidedly favorable effect upon the efficiency of the fly sprays, in which mineral oils having properties specified above are used.

I have observed also, that the odoriferous components of fly-repelling spray, among which various grades of commercial pine oils and naphthalene compounds are the ones most commonly used, usually boil within a narrow and low temperature range and are usually concentrated, for that reason, within a relatively narrow low boiling fraction of the spray mixture. This results, as I have discovered, in a marked decrease in the repelling efficiency of the spray soon after its application, due to the fact that the repellant evaporates more rapidly than the larger portion of the mineral oil components in the spray. I have discovered, furthermore, that this deficiency can be successfully corrected by the method of selecting the fly spray components now to be described.

According to this invention, I compound my fly-repelling sprays from the properly selected mineral oil distillates and fly-repelling substances, both boiling within approximately the same boiling range. I obtained in this manner sprays, which retain their fly-repelling power without substantial exhaustion during protracted periods of time, depending upon atmospheric conditions as well as the boiling range of the spray.

By conducting an extensive series of experiments I have found that, while the rate of distillation of the desirable pine oils, or other fly-repelling substances, may vary, it is preferable to employ for this purpose oils with less than 95% distilling below 250° C. and the final boiling point not exceeding 390° C. (A. S. T. M. 158—28), thus approximately corresponding to the boiling range of mineral oils used as carriers.

Generally, I prefer to use the repellant having its 90% distillation point not more than 60° C. below the corresponding boiling point of the mineral oil used for preparing the fly spray.

As an illustrative example of the fly-repelling spray of my composition, the following data are presented:

|  | Components | | | Spray* |
|---|---|---|---|---|
|  | Pale oil | Kerosene* | Pine oil | 57% Pale oil, 40% kerosene, 3% pine oil |
| Gravity, °A. P. I | 29.5 | 44.6 | 17.7 | 35.0. |
| Color | 1½ N. P. A | 30+Say | Opaque | 2 N. P. A. |
| Visc. S. U. at 100° F | 65 | 31 | 55 | 40. |
| Unsulf. Res., percent vol | 90 | 99.0 |  | 92. |
| Distill. Range I. B. P | 276° C | 177° C | 172° C | 185° C. |
| 90% Distilled at | 386° C | 265° C | 340° C | 372° C. |

* May contain pyrethrum extract.

After eight hours from the time the animals were sprayed, the fly-repelling efficiency of the above described spray was found to be 30% higher than the efficiency of a representative of marketed sprays, which differed from the one above only by the boiling range of the pine oil used, which was from 201° C. to 232° C., as compared to 172° C.–340° C. in my preferred composition.

I claim as my invention:
1. A fly-repelling spray, comprising: a mineral oil and a pine oil repellant, both boiling within substantially the same boiling range.
2. The composition as claimed in claim 1, in which the sulfonation residue of mineral oil is not less than 85% by volume.
3. A fly-repelling spray comprising: a mineral oil and a pine oil repellant, the 90% distillation point of the former being not higher than 60° C. from the corresponding distillation temperature of the latter.
4. A fly-repelling spray, comprising: a mineral oil having viscosity of from 40 to 75 seconds Say. Univ. at 100° F., and a pine oil repellant, both boiling within substantially the same boiling range.
5. A fly-repelling spray, comprising: a refined mineral oil having the 90% distillation point below 400° C. and viscosity of from 40 to 75 seconds Say. Univ. at 100° F., and a pine oil repellant having the corresponding distillation temperature point not lower than 60° C. from that of said mineral oil.

GIDEON JOHN MALHERBE.